No. 824,151. PATENTED JUNE 26, 1906.
C. SCHMIDT.
MOTOR VEHICLE BRAKE.
APPLICATION FILED FEB. 4, 1905.

3 SHEETS—SHEET 1.

Witnesses
Inventor
Charles Schmidt
Attorneys

No. 824,151. PATENTED JUNE 26, 1906.
C. SCHMIDT.
MOTOR VEHICLE BRAKE.
APPLICATION FILED FEB. 4, 1905.

3 SHEETS—SHEET 2.

Witnesses
J. G. Hinkel

Inventor
Charles Schmidt
By Foster Freeman & Watson
Attorneys

No. 824,151.  
PATENTED JUNE 26, 1906.  
C. SCHMIDT.  
MOTOR VEHICLE BRAKE.  
APPLICATION FILED FEB. 4, 1905.

3 SHEETS—SHEET 3.

Witnesses  
Inventor  
Charles Schmidt  
By Foster Freeman & Watson  
Attorneys

UNITED STATES PATENT OFFICE.

CHARLES SCHMIDT, OF DETROIT, MICHIGAN, ASSIGNOR TO PACKARD MOTOR CAR COMPANY, OF DETROIT, MICHIGAN, A CORPORATION OF WEST VIRGINIA.

MOTOR-VEHICLE BRAKE.

No. 824,151.      Specification of Letters Patent.      Patented June 26, 1906.

Application filed February 4, 1905. Serial No. 244,202.

*To all whom it may concern:*

Be it known that I, CHARLES SCHMIDT, a citizen of the Republic of France, and a resident of Detroit, Wayne county, State of Michigan, have invented certain new and useful Improvements in Motor-Vehicle Brakes, of which the following is a specification.

The present invention relates to improvements in braking mechanism for automobiles; and it comprises two sets of braking devices for each of the driving-axle sections and means for operating said devices either independently or simultaneously.

The invention will be described in connection with the accompanying drawings, in which—

Figure 1:
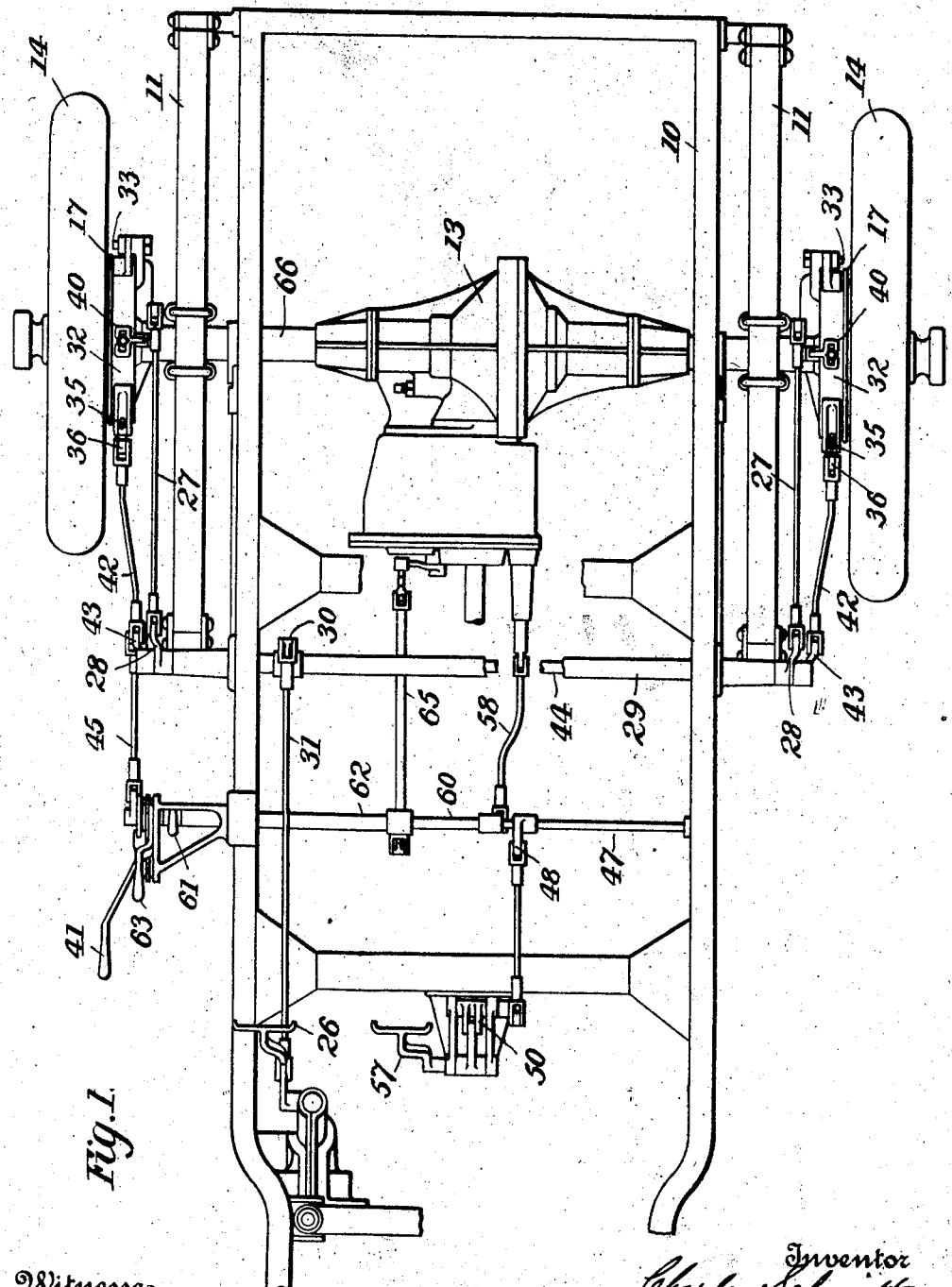
Figure 2:
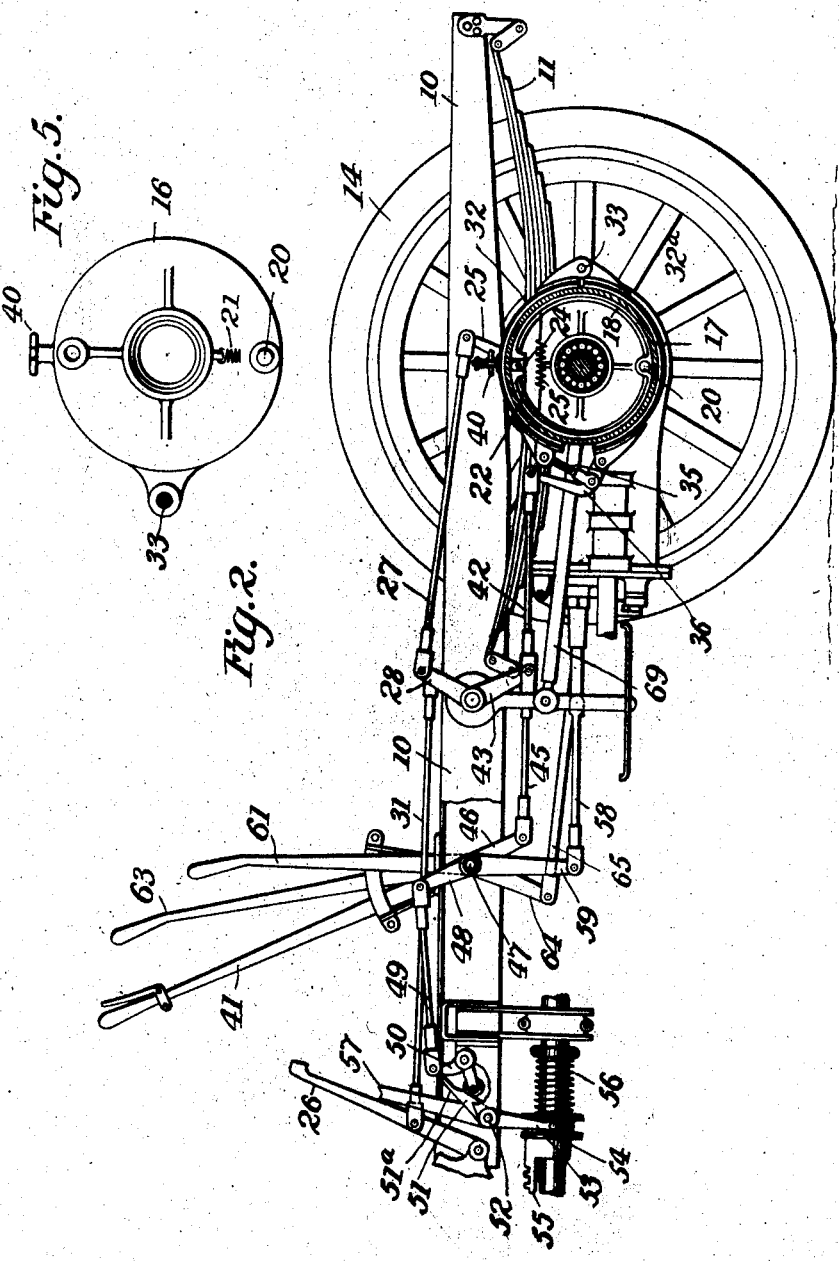
Figure 3:
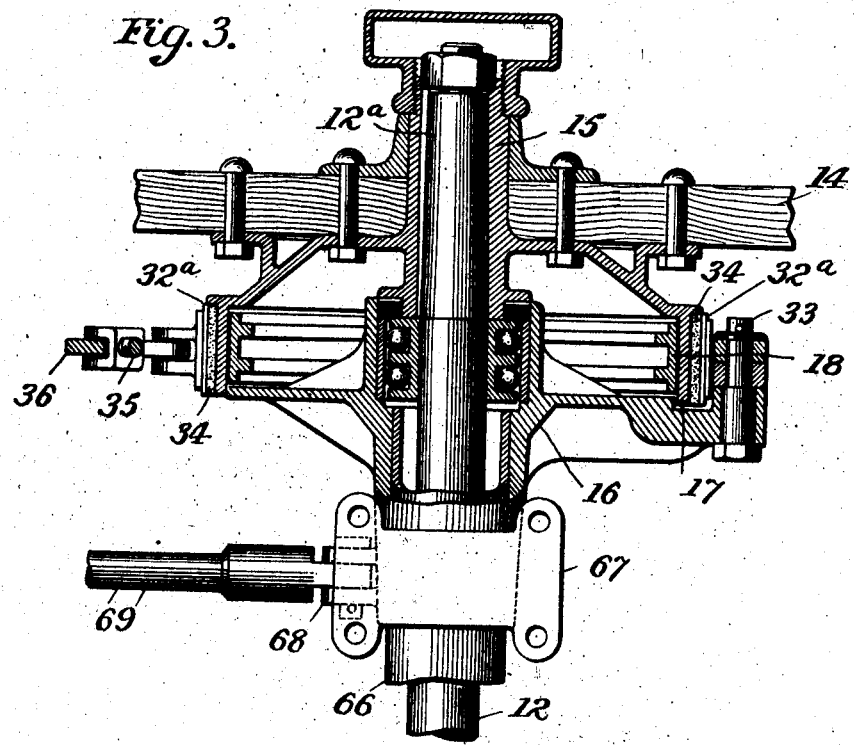
Figure 4:
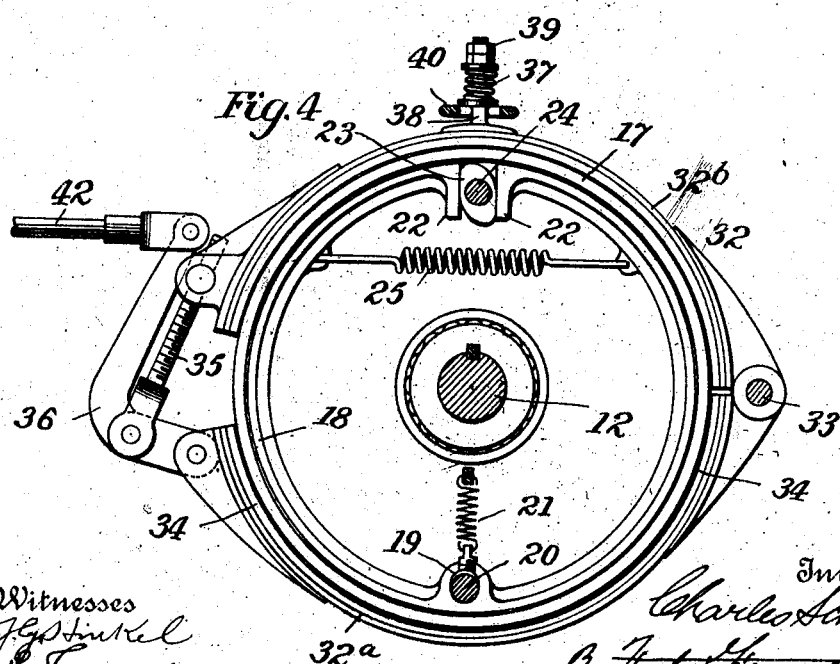

Figure 1 is a plan view of a portion of a motor-vehicle frame, showing the driving-axle, the brake mechanism, and the gear-case mounted thereon. Fig. 2 is a side elevation of the apparatus shown in Fig. 1, one of the rear wheels being broken away to disclose the brake proper. Fig. 3 is a horizontal section through one of the rear hubs. Fig. 4 is a side elevation of a brake proper, and Fig. 5 is an inside view of the bracket which supports the brake-shoes and their operating cams and levers.

Referring to the drawings, 10 indicates the main frame of the vehicle, said frame being supported on suitable springs 11, which rest on the rear axle 12. The rear axle is preferably constructed in two sections in the usual manner, said sections being connected and driven by gearing inclosed in a gear-case 13. The construction of the rear axle and the mechanism for driving it have no bearing upon the present invention, and therefore they will not be described in detail.

Each rear wheel 14 has a hub 15, which is fast on a rear-axle section 12. The rotatable rear-axle sections 12 are carried in fixed cylindrical rear axle-casings 66, the inner ends of which are rigidly connected to the gear-case and the outer ends of which are provided with integral disk-like brackets 16, to be hereinafter referred to. Rigidly connected with the hubs 15 are cylindrical flanges 17. These flanges rotate with the wheels, and brake-shoes coöperate with both their inner and outer surfaces. Each inner brake-shoe 18 consists in a ring which is pivotally connected with the bracket 16 at one side and which is open at the opposite side and receives between its ends a cam adapted to expand the ring. As shown in Figs. 3 and 4, the ring 18 is provided with an elongated opening 19, which receives a fixed stud 20, mounted on the bracket 16. As shown, the stud 20 is at the lower side of the brake-shoe, and when released the shoe would tend to drop into contact with the flange 17. To counteract this tendency, a spring 21 connects the brake-shoe with the bracket 16 and constantly tends to raise it. The elongated opening 19 permits the shoe to be raised sufficiently to clear the rotating flange 17. The ends 22 of the ring 18 are broad and constitute bearing-surfaces for a double cam 23, mounted on a rock-shaft 24. A spring 25 holds the ring ends in contact with the cam, and the cam is of such shape that when partially turned it will expand the ring against the flange 17. By reason of the elongated opening 19 the ring can be expanded so that every portion of it will bear with uniform pressure against the flange. The stud 20 and the shaft 24 prevent the brake-shoe from turning, and hence a powerful resistance to the rotation of the wheel is obtained.

The shaft 24 is mounted in the bracket 16 and at its inner end carries an arm 25. This arm 25 is connected with a pedal 26 for operating the inner brake by means of link 27, arm 28, hollow shaft 29, arm 30, and link 31. When the pedal 26 is pushed forward, the shaft 24 is rocked and the inside brake applied. When the pedal is released, the springs 21 and 25 throw off the brake. An additional spring may be used to draw the pedal forward to its normal position. There are arms 28 at opposite ends of the hollow shaft 29 and connections from said arms to two inside brakes, as shown in Fig. 1.

Referring again to Figs. 3 and 4, 32 indicates the outside brake, which consists of two approximately semicircular bands 32ª 32ᵇ, hinged at one side to a stud 33, fixed to the bracket 16. These sections 32ª 32ᵇ are preferably provided with linings 34, of felt, leather, or other suitable fabric. The free ends of the brake-sections 32ª 32ᵇ are connected by toggle-levers 35 36, one of said levers being screw-threaded and adjustably connected with one of the brake-sections, while the other lever is pivotally connected with the other brake-section. The upper brake-section $32^b$ tends normally to rest upon the rotating flange 17, and to hold the brake normally free from the flange a spring 37 is provided, Fig. 4. A post 38 is connected with the brake-shoe $32^b$ and provided at its upper end with an adjustable head or nut 39. The spring 37 is interposed between the head 39 and an extension 40 of the bracket 16. The lower brake-shoe $32^a$ separates from the rotating flange 17 by gravity, while the upper brake-shoe $32^b$ is raised by the spring 37 when the toggle-levers are in position to throw off the brake, as illustrated in Fig. 4. The head 39 should be adjusted so that the separation of the shoes $32^a$ $32^b$ from the flange shall be substantially equal. The toggle-levers 36 are in the form of elbow-levers, and they are connected to operate the brake with a hand-lever 41 by means of links 42 and arms 43 on shaft 44. One of the arms 43 is connected by a link 45 with an arm 46 on a shaft 47. The brake-lever 41 is rigidly connected with said shaft 47. The operation of the brake-lever 41 rocks the shaft 47, and through the connections mentioned it applies the outer brake 32 to the rotating flange 17. Upon the shaft 47 is an arm 48, which is connected by a link 49 with an elbow-lever 50. The elbow-lever 50 carries a roll which is adapted to rock an arm 51 when the brake is applied. The arm 51 is mounted on a clutch-operating shaft 52. On this shaft is an arm 53, which engages a sliding collar 54. This collar is connected with the clutch (not shown) by means of a rack 55 or any other suitable connection. The clutch is normally closed by means of a spring 56 and it can also be thrown out by means of a pedal 57.

In Figs. 1 and 2 of the drawings is shown a link 58 for operating the speed-gears, said link being connected to an arm 59 on a hollow shaft 60, which shaft is rocked by means of a hand-lever 63. The shaft 60 surrounds a portion of the shaft 47. On the shaft 60 is a second hollow shaft 62, operated by a lever 61. An arm 64 on shaft 62 is connected by a link 65 with means for shifting the reverse-gear.

In the ordinary operation of the brake mechanism the hand brake-lever 41 and the outer brake-shoes are employed. As these outer brakes are applied the clutch is opened and the motive power cut out. The inner brakes are used on very steep hills or in making emergency stops. The arm 51 has a notch or recess $51^a$, Fig. 2, into which the roll on the elbow-lever 50 fits. This interlocking of the roll and the notch assists in holding the clutch open until the brake is released.

The brackets 16 are preferably integral portions of the stationary rear-axle casing 66. The rear-axle casing has integral supports 67 for the springs 11 and integral lugs 68 for the brace-rod 69. The stationary axle-casing 66 therefore provides supports or connections for the springs, the brace-rods, the inner and outer brakes, the springs for throwing off the inner and outer brakes, and in addition provides bearings for the rotating axle-sections 12.

It will be evident that various changes in the details of construction and arrangement of the foregoing apparatus may be made without departing from the spirit and scope of my invention. For instance, it is immaterial whether the inner or the outer brakes be operated from the hand-lever. Any suitable lever or equivalent device may be used to operate either brake.

Without limiting myself to the precise construction and arrangement of parts illustrated and described, I claim—

In a motor-vehicle, the combination with the fixed rear-axle casing, the rear-axle sections rotating in said casing and the wheels connected to said sections and provided with inner and outer braking-surfaces, of brackets 16 integral with said rear-axle casing, inner and outer brakes supported by each of said brackets, springs supported by said brackets for raising both the inner and outer brake-shoes from the braking-surfaces of the wheel, studs upon said brackets for carrying said inner and outer brake-shoes, and means for applying said inner and outer brake-shoes independently.

In testimony whereof I have signed my name to this specification in the presence of two subscribing witnesses.

CHARLES SCHMIDT.

Witnesses:
 RUSSELL HUFF,
 F. E. PAINE, Jr.